United States Patent [19]

Bart

[11] 4,132,201

[45] Jan. 2, 1979

[54] METERING VALVE FOR FUEL INJECTION

[75] Inventor: Hansueli Bart, Whitehall, Mich.

[73] Assignee: Eaton Corporation, Cleveland, Ohio

[21] Appl. No.: 689,391

[22] Filed: May 24, 1976

Related U.S. Application Data

[62] Division of Ser. No. 403,308, Nov. 3, 1973, abandoned.

[51] Int. Cl.² ..................... F02M 39/00; F02M 57/00
[52] U.S. Cl. .......................... 123/139 E; 123/139 AL
[58] Field of Search ...................... 123/139 E, 139 AL

[56] References Cited

U.S. PATENT DOCUMENTS

| 3,719,435 | 3/1973 | Eheim | 123/139E |
| 3,797,235 | 3/1974 | Eheim | 123/139 E |

*Primary Examiner*—Stephen C. Bentley
*Assistant Examiner*—Thomas H. Webb

*Attorney, Agent, or Firm*—Robert J. McCloskey; Paul S. Rulon

[57] ABSTRACT

A pilot fuel injection system for a diesel engine. One embodiment of the system includes a high pressure fuel pump, an accumulator, a mechanical fuel distributor, a pair of fuel metering valves for each cylinder of the engine, a fuel injection nozzle for each cylinder, and an electronic logic system for controlling actuation of the metering valves; in a second system embodiment a pair of the metering valves supply fuel to all of the engine cylinders. Several embodiments of the metering valve are disclosed, some of which allows exclusion of the mechanical fuel distributor from the system. All of the disclosed metering valves meter fuel from the pump to the nozzles by traversing a passage in a valving member across another passage. Motion is imparted to the valving member by electromagnetic means which are energized by the electronic logic. The logic is responsive to engine speed and throttle position.

32 Claims, 9 Drawing Figures

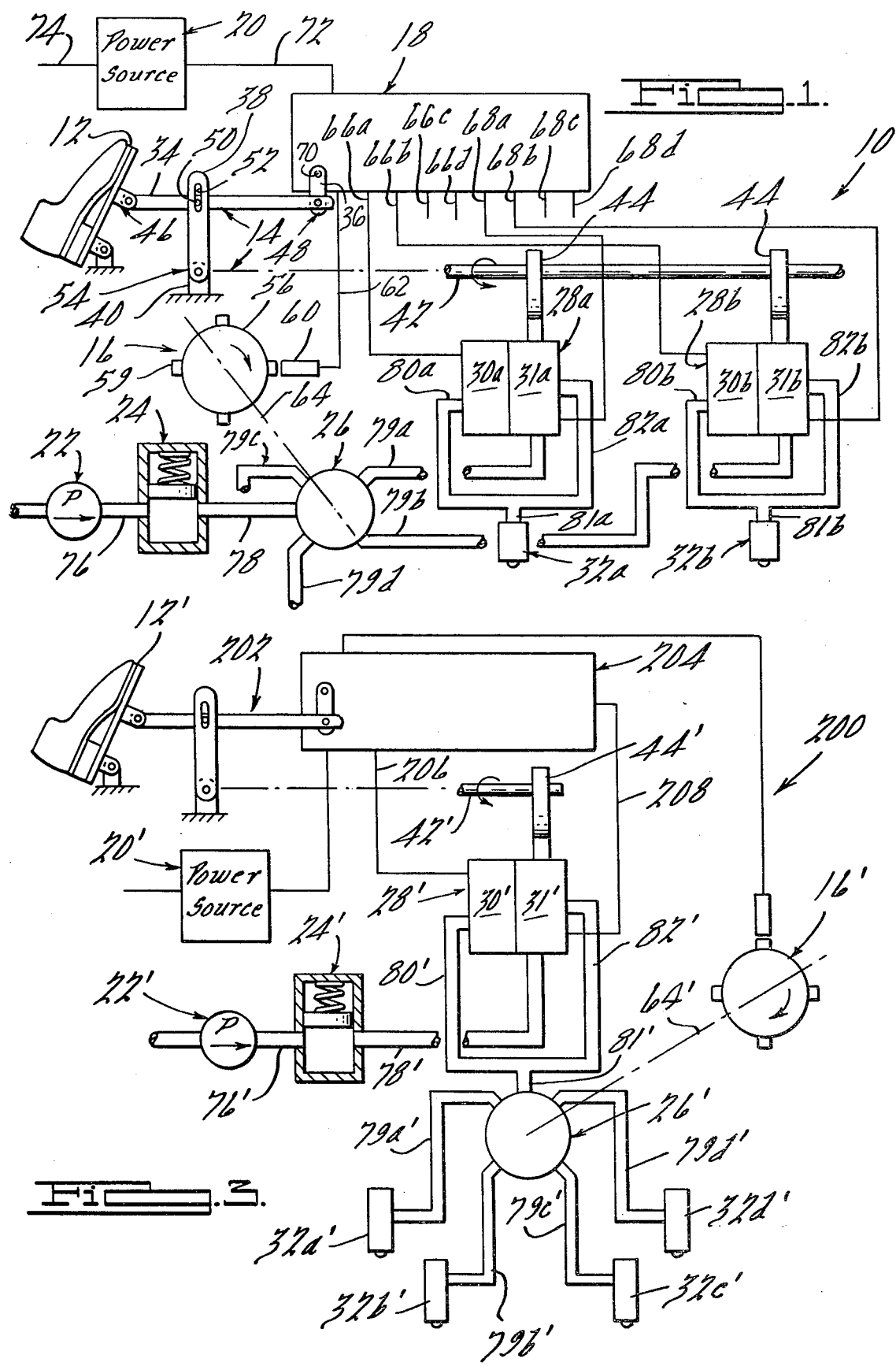

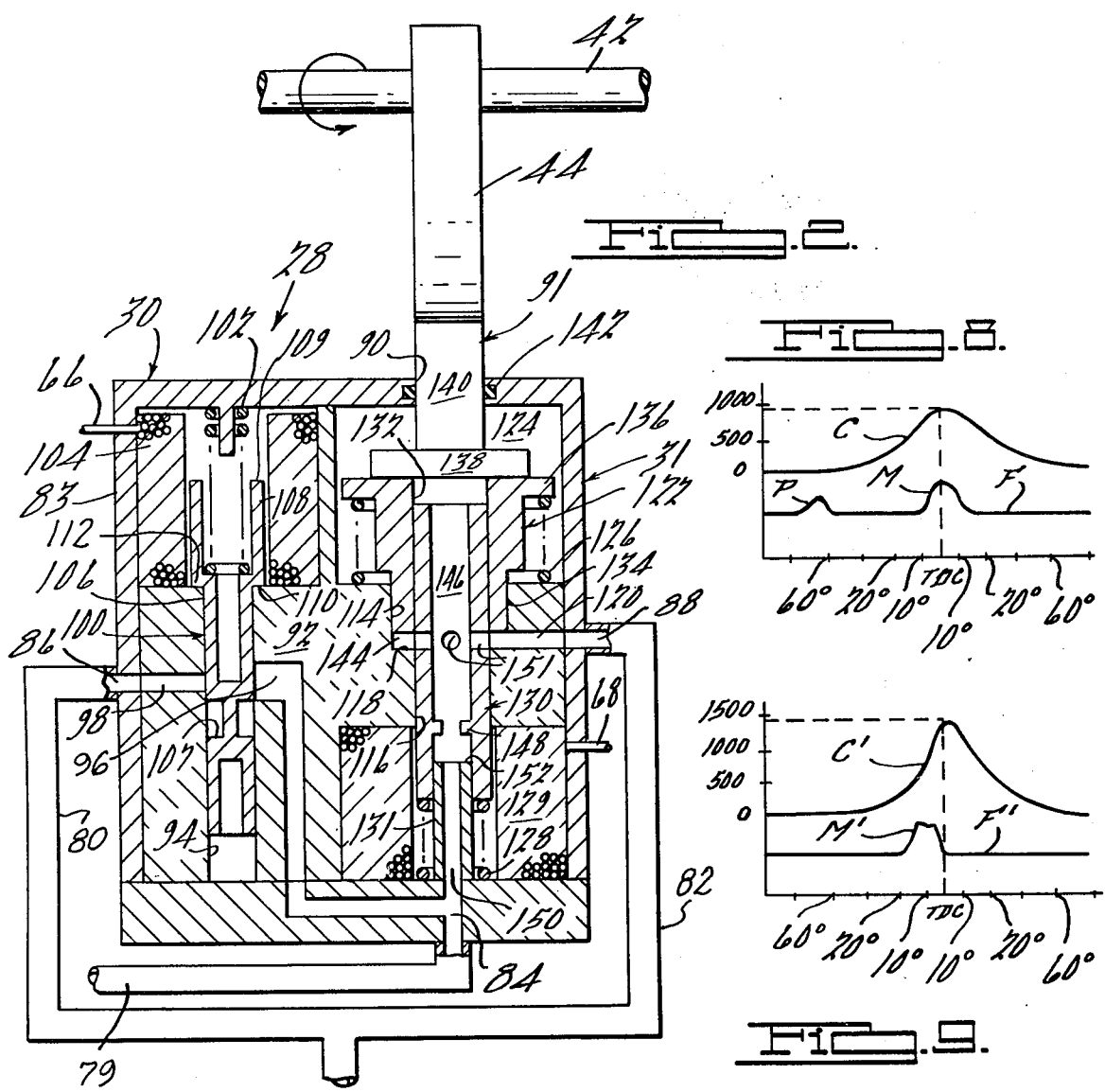

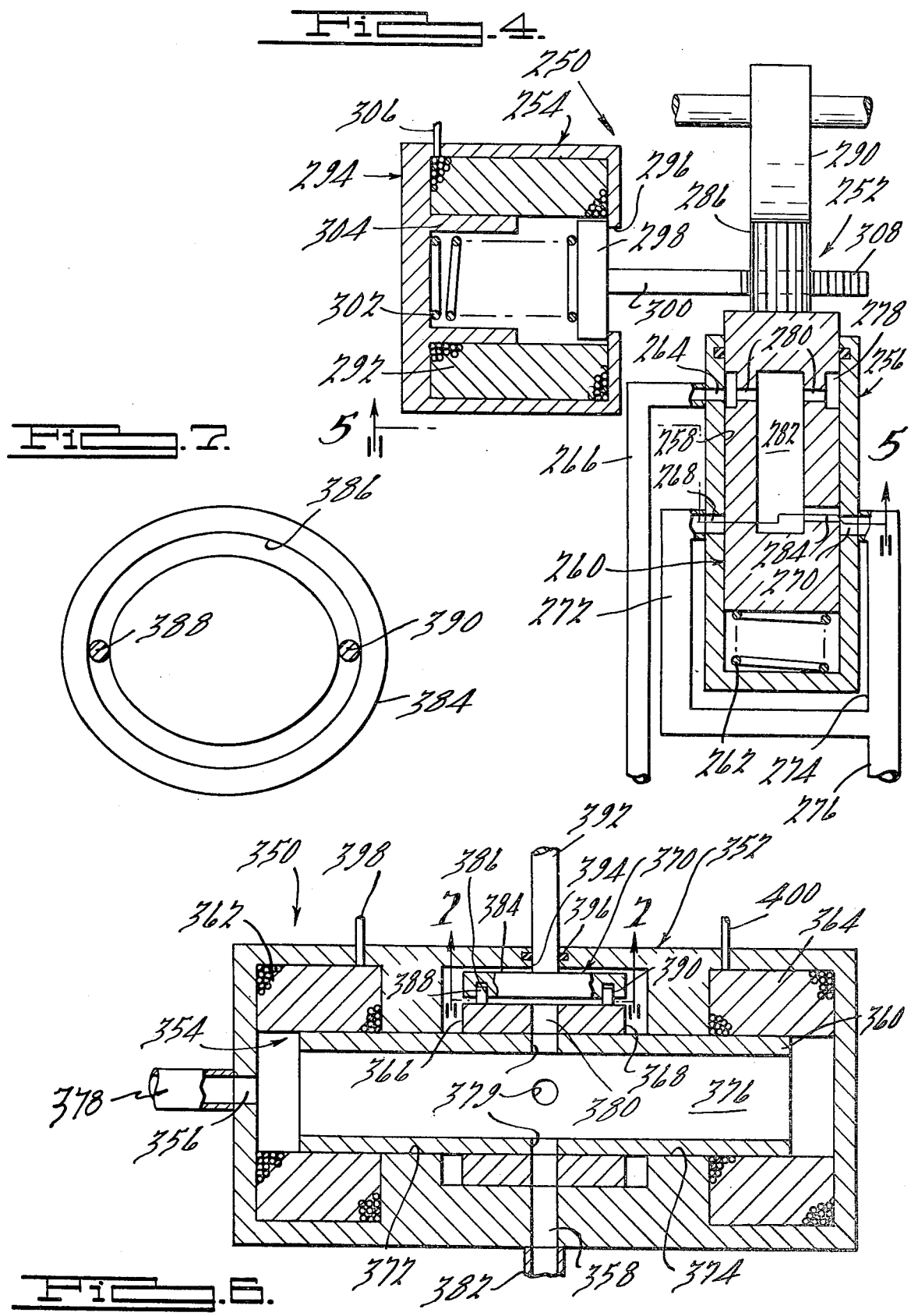

METERING VALVE FOR FUEL INJECTION

This application is a division of application Ser. No. 403,308, filed Nov. 3, 1973, now abandoned.

FIELD OF THE INVENTION

This invention relates to a fluid metering valve; more specifically, to a fuel metering valve in a direct injection fuel system used on a compression ignition engine.

BACKGROUND OF THE INVENTION

Fuel injection systems for internal combustion engines are well known. Likewise, methods and advantages of pilot fuel injection are known, having been described by Dr. P. H. Schweitzer, "What can be Gained by Pilot Injection" *Automotive Industries,* Vol. 79 (1938) pp 533–534; G. Monnot et al, U.S. Pat. No. 2,966,079; and P. Eyzat, U.S. Pat. No. 3,439,655. Dr. Schweitzer's article points out some of the advantages obtainable with pilot injection, e.g. elimination of the characteristic diesel knock by reducing the rate of cylinder pressure rise per degree of crankshaft rotation, lower peak cylinder pressure, increased power output, and a reduction in fuel consumption per horsepower hour. Dr. Schweitzer also identifies a problem encountered when attempting to reduce the pilot fuel injection concept to practice; specifically, providing a fuel metering valve which produces a stable pilot charge over the full operating range of the engine.

Since Dr. Schweitzer's contributions, researchers have confirmed the stated advantages of the pilot fuel injection concept and in addition have discovered that the concept can be used to reduce pollutant exhaust emissions, such as oxides of nitrogen, while retaining the stated advantages. However, the problem of economically reducing the concept to practice in a manner that provides all of the obtainable advantages of the concept over the full operating range of the engine has remained unsolved. To obtain all of the possible advantages of the pilot injection concept, the injection system must be capable of accurately metering very small amounts of pilot fuel to the engine cylinder followed by an equally accurately metered main fuel charge; the timing of the pilot and main charges must be variable with respect to the crankshaft timing; the timing to the pilot charge must be variable with respect to the main charge; the amount of the main charge must of course be variable; and in some cases the amount of the pilot charge must be variable to obtain ultimate results.

SUMMARY OF THE INVENTION

An object of this invention is to provide a simple and low cost valve capable of metering a very small and accurate pulse of fluid.

Another object of this invention is to provide a fluid metering valve which is readily controlled to vary the timing of the fluid pulses metered by the valve.

Another object of this invention is to provide a fluid metering valve which is readily controlled to vary the amount of fluid in each pulse metered by the valve.

According to an important feature of this invention, the fluid metering valve includes a valve housing having a bore and fluid inlet and fluid outlet passages which both open into the bore. A movable valving member is disposed in the bore in slideable sealing contact with the bore and a fluid passage is provided in the movable valving member. Means are provided for moving the valving member from a first static position blocking fluid communication between said inlet and outlet passages to a second static position also blocking the fluid communication and causing the passage in the moveable valving member to traverse at least one of the fluid passage openings in the valve housing. During this traversing time, a continuous passage through the valve is momentarily defined. Since the velocity of the valving member need not be reversed during the time the continuous passage is defined, a very small and accurate fluid pulse may be metered through the valve.

According to another feature of the invention, the effective area of the momentary continuous passage may be selectively varied to selectively control the amount of metered fluid in each pulse during the traversing time of the passage.

According to another feature of the invention, electromagnetic means are used to impart motion to the valving member, whereby the timing of the metered fluid pulses may be readily varied.

BRIEF DESCRIPTION OF THE DRAWINGS

Preferred embodiments of the invention are shown in the accompanying drawings in which:

FIG. 1 is a schematic view of a portion of a pilot fuel injection system employing a double fuel metering valve;

FIG. 2 is a schematic, cross-sectional view of a double fuel metering valve for use in the system of FIG. 1;

FIG. 3 is a schematic view of a second pilot fuel injection system employing a double fuel metering valve;

FIG. 4 is a schematic cross-sectional view of another fuel metering valve;

FIG. 5 is a cross-sectional view of the valve in FIG. 4, looking in the direction of arrows 5—5 in FIG. 4.

FIG. 6 is a schematic cross-sectional view of another single fuel metering valve;

FIG. 7 is a cross-sectional view of a portion of the valve in FIG. 6, looking in the direction of arrows 7—7 in FIG. 6.

FIG. 8 is an oscilloscope trace of a fuel injection pulse and cylinder pressure for an engine cylinder provided with pilot fuel injection.

FIG. 9 is an oscilloscope trace of a fuel injection pulse and cylinder pressure for the same engine cylinder provided with a single pulse fuel injection system and operating at the same horsepower as the cylinder in FIG. 8.

DETAILED DESCRIPTION OF FIG. 1

FIG. 1 schematically illustrates a pilot fuel injection system 10 for a compression ignition piston engine, not shown. System 10 includes a throttle pedal 12 connected to a throttle linkage assembly 14, a magnetic pickup assembly 16, an electronic logic 18, a power source 20, a fuel pump 22, an accumulator 24, a mechanical fuel distributor 26, double fuel metering valves 28*a* and 28*b* and fuel injection valves 32*a* and 32*b*. The injection system of FIG. 1 is intended for a four cylinder engine and has one double fuel metering valve per cylinder; however, for simplicity only two valves are shown. Each of the double fuel metering valves contain a pilot fuel metering valve and a main fuel metering valve, e.g., valve 28*a* contains a pilot fuel metering valve 30*a* and a main fuel metering valve 31*a*, valve 28*b* contains a pilot fuel metering valve 30*b* and a main fuel metering valve 31*b*, etc. All of the components in FIG. 1 are shown schematically and all, except double fuel metering valves 28*a* and 28*b*, may be per se of conventional design and construction; hence these conventional components require only brief comment to explain their individual and system functions.

Linkage assembly 14 includes a rod 34, a link 36, a crank arm 38, a support 40, a torque shaft 42, and cams 44. Rod 34 is pivotally pinned to throttle pedal 12 at 46 and to link 36 at 48. The upper end of crank arm 38 is connected to rod 34 via a pin 50 which is slideably disposed at one end in a slot 52 in arm 38 and at the other end fixed to rod 34. The lower end of crank arm 38 is pivotally connected to support 40 and securely fixed to torque shaft 42 at 54. Cams 44 are secured to rotate with shaft 42.

Magnetic pickup assembly 16 includes a toothed wheel 56 having four teeth 59 (one tooth per cylinder is shown for illustrational purposes) and a magnetic sensor 60. Toothed wheel 56 is driven at camshaft speed. Rotation of wheel 56 induces a cyclic signal into sensor 60 which is connected to logic 18 via wire 62. The period of the cyclic signal is of course a function of the number of teeth 59 and the rotational speed of the wheel. A phantom line 64 merely shows that toothed wheel 56 and mechanical distributor 26 are driven from a common shaft (not shown) and at the same speed.

Electronic logic 18 is a distributor and timing device which provides electrical signals to pilot fuel metering valves 30a and 30b via wires 66a and 66b and main fuel metering valves 31a and 31b via wires 68a and 68b. Wires 66c, 66d, 68c, and 68d are for providing electrical signals to additional pilot and main fuel metering valves. The distributor portion of the logic is preprogrammed to provide the electrical signals to actuate the pilot and main fuel metering valves in the engine firing order. The timing portion of the logic adjusts the timing of the electrical signals with respect to top dead center (TDC) of the crankshaft for each cylinder in response to engine speed and throttle position. The logic adjusts timing by first interpreting the speed signal from sensor 60 and advancing or retarding the pilot and/or main metering valve electrical signals with respect to TDC and/or each other as a function of speed. The logic then interprets the throttle position, which is supplied to the logic via a shaft 70 secured to link 36 and projecting into logic 18; the logic responds to the angular position of shaft 70 and advances or retards the pilot and/or main metering valve electrical signals with respect to TDC and/or each other as a function of throttle position which is in essence a demand signal to the logic. A simplified version of a logic that will readily provide the basic function of logic 18 may be found in U.S. Pat. No. 2,077,259.

Power source 20 supplies electrical energy to logic 18 via a wire 72. The power source may be the engine electrical generating and storage battery system; however, it is preferably a constant voltage regulating device which is connected to the engine generator and storage battery system via a wire 74.

Fuel pump 22, accumulator 24, and mechanical fuel distributor 26 are of conventional construction and are well known in the art. Pump 22 may be engine driven and supplies high pressure fuel to accumulator 24 via a tube 76. The fuel pressure supplied by pump 22 may be in the order of 4,000 to 10,000 psi or more; however, the term high, as used herein, is not confined to these peressures, but rather should be construed to distinguish the high pressure required for fuel injection into an engine cylinder over the relatively low pressure required for fuel injection into an engine intake manifold. Accumulator 24 dampens fuel pressure pulses. A tube 78 supplies high pressure fuel to distributor 26. Distributor 26 is of the well known type having a fixed disc with a plurality of fuel outlet ports connected to tubes 79a, 79b, 79c, and 79d and a rotating disc with a single inlet port. The rotating disc is driven at camshaft speed and the inlet port is in constant communication with the high pressure fuel in tube 78; the inlet port traverses the outlet ports and pressurizes tubes 79a, 79b, 79c, and 79d in the engine firing order. Tube 79a supplies fuel to valve 28a; tube 79b supplies fuel to valve 28b, etc. A common fuel inlet passage in the housing of each valve 28a and 28b communicates the high pressure fuel to the pilot and main fuel metering valves in that housing. The fuel inlet ports in the rotating disc or the fuel outlet ports in the fixed disc of the distributor should be arcuate slots to ensure a supply of high pressure fuel to each double fuel metering valve for a period that covers the timing range of each cylinder.

Each double fuel metering valve is connected to a fuel injection nozzle which discharges directly into an engine cylinder (not shown). Fuel metered by pilot fuel metering valve 30a flows to fuel injection nozzle 32a via tubes 80a and 81a; fuel metered by main fuel metering valve 31a flows to fuel injection nozzle 32a via tubes 82a and 81a. Valves 30b and 31b are connected to nozzle 32b via tubes 80b, 81b, and 82b in the same manner.

DETAILED DESCRIPTION OF FIG. 2

The structure and operation of each double fuel metering valve 28 is the same, hence, an explanation of one will suffice for all. FIG. 2 illustrates the conceptional details of valve 28. Double fuel metering valve 28 includes a housing 83, which encloses the pilot fuel metering valve 30 and main fuel metering valve 31, a fuel inlet passage 84, two fuel outlet passages 86 and 88, and an opening 90 through which passes a cam follower 91. The body of valves 30 and 31 are machined from a single metal block 92.

The pilot fuel metering valve is vertically disposed in the left portion of housing 83 and includes a bore 94, a fuel inlet passage 96 communicating passage 84 with bore 94, a fuel outlet passage 98 communicating bore 94 with passage 86, a shuttle or movable valving member 100, a helical spring 102, and an electromagnetic coil 104 connected to wire 66. Movable valving member 100 includes a stem portion 106 in slideable sealing contact with the walls of bore 94, an annular groove 107, and a cup-shaped portion 108. The upper extent of cup-shaped portion 108 defines an annular rim 109 which engages the wall of housing 83 to limit upward travel of valving member 100. The lower extent of cup-shaped portion 108 defines a shoulder 110 which engages a shoulder 112 to limit downward travel of the valving member. When shoulders 110 and 112 are engaged annular groove 107 is below passage 98, whereby stem 106 blocks communication between passages 96 and 98. When rim portion 109 engages the wall of housing 83 groove 107 is above passage 98, whereby stem 106 blocks communication between passages 96 and 98. Hence, the range of travel of valving member 100 is defined by shoulders 110 and 112 in the downward direction and by rim 109 and the wall of housing 83 in the upward direction. Spring 102 biases valving member 100 downward. When coil 104 receives a pilot fuel injection signal from logic 18, via wire 66, an electromagnetic field is established which shuttles valving member 100 upward its full travel range against the biasing force of spring 102. Metering of the pilot fuel charge occurs only during upward travel of movable valving member 100 and only during the time period required for annular groove 107 to traverse passage 98. The pilot signal is maintained during the full timing range of each cylinder being supplied. At the end of the timing range distributor 26 blocks fuel flow to passage 96, the pilot signal is terminated by logic 18, and spring 102 then shuttles valving member 100 downward; this sequence prevents a second metering of fuel into passage 98 on the return stroke of movable valving member 100.

Main fuel metering valve 31 is vertically disposed in the right portion of housing 83. Valve 31 includes two axially aligned bores 114 and 116 which define a stepped bore having a shoulder 118, a fuel outlet passage 120 communicating with passage 88, a stepped sleeve 122 principally disposed in a chamber 124, cam follower 91, two helical springs 126 and 128, an electromagnetic coil 129, a cylindrical shuttle or movable valving member 130, and a cylindrical sleeve 131. Stepped sleeve 122 includes a bore 132 having the same diameter as bore 116, a reduced outer diameter 134 at its lower extent in slideable sealing contact with bore 114, and a radially extending flange 136 at its upper extent. Sleeve 122 is biased upward by spring 126. Cam follower 91 includes a radially extending flange 138 which rests on flange 136 and a round shaft portion 140 in sliding contact with cam 44. A seal 142 prevents fuel leakage around shaft portion 140. A passage (not shown) in flange 136 allows fluid communication between bore 132 and chamber 124. The lower end face of sleeve 122 cooperates with shoulder 118 to define an annular fuel passage 144 which is variable in vertical height or cross-sectional area in response to movement of sleeve 122 by cam 44. Annular passage 144 communicates bore 114 with passage 88. The outer wall of movable valving member 130 is in slideable sealing contact with the walls of bores 116 and 132. The inner wall of valve member 130 defines a fuel passage 146 which freely telescopes over cylindrical sleeve 131. A pair of stops 148 project inwardly from the wall of passage 146. Cylindrical sleeve 131 is fixed at its lower extent to housing 83, defines a passage 150 which communicates passages 84 and 146, and defines a stop 152 at its upper extent which cooperates with stops 148 to limit downward travel of the valving member. Valving member 130 also includes a plurality of radially extending ports 151 which communicate passage 146 with annular passage 144. Valving member 130 is biased upward to its rest or off position by spring 128.

Operation of main metering valve 31 differs from that of pilot metering valve in that the amount of metered fuel may be controlled by varying the vertical height of annular passage 144. When coil 129 receives a main fuel injection signal from logic 18, via wire 68, an electromagnetic field is established which shuttles valving member 130 downward until stops 148 and 152 engage. Metering of the main fuel charge occurs only during downward travel of the valving member and only during the time period required for ports 151 to traverse annular passage 144. The main fuel injection signal is maintained during the full timing range of the cylinder being supplied by each double metering valve. At the end of the timing range, which is coincident with that of the pilot valve, distributor 26 blocks fuel flow to passage 84, the main fuel injection signal is terminated by the logic, and spring 128 then shuttles valving member 130 upward; this sequence allows ports 151 to traverse annular passage 144 without causing a second flow of fuel into the annular passage.

DETAILED DESCRIPTION OF FIG. 3

FIG. 3 schematically illustrates a second embodiment of a pilot fuel injection system designated by the numeral 200. The principle difference between systems 10 and 200 is the position of the mechanical fuel distributor and the use of one double fuel metering valve in system 200; one double fuel metering valve supplies fuel to all of the engine cylinders and the fuel distributor directs the metered fuel pulses to the correct cylinder. The component parts of system 200 which are the same as those in system 10 are designated with numerals corresponding to those in FIG. 1 followed by a prime. System 200 includes a throttle 12' connected to a throttle linkage assembly 202, a magnetic pickup assembly 16', an electronic logic 204, a power source 20', a fuel pump 22', an accumulator 24', a mechanical fuel distributor 26', a double fuel metering valve 28', and four fuel injection nozzles 32a', 32b', 32c', and 32d'.

Linkage assembly 202 has one cam and differs from that of assembly 14 only in this respect. Logic 204 has one pilot fuel metering valve wire 206 and one main fuel metering valve wire 208; otherwise the logics are identical. High pressure fuel is continuously supplied to double fuel metering valve 28 by tube 78'.

DETAILED DESCRIPTION OF FIGS. 4 AND 5

FIGS. 4 and 5 schematically illustrate a second embodiment of a fuel metering valve 250 which is adaptable for use in the fuel injection systems of FIGS. 1 and 3. Valve 250 may be used as a main fuel metering valve or a pilot fuel metering valve; two of them may be combined into a single housing to provide a double fuel metering valve such as valve 28. In the following description valve 250 will function as a main fuel metering valve, this description being equally applicable to the valve functioning to meter pilot fuel by merely connecting the valve into the injection system for this function.

Metering valve 250 includes a metering valve assembly 252 and a drive assembly 254. Metering valve assembly 252 includes a cup-shaped housing 256 defining a cylindrical bore 258, a movable valving member 260, and a helical spring 262. A fuel inlet passage 264 in housing 256 communicates bore 258 with a source of high pressure fuel via a tube 266. In the systems of FIGS. 1 and 3, tube 266 would communicate directly with the fuel accumulator; hence, the mechanical fuel distributor would not be required in the system of FIG. 1. Two fuel outlet passages 268 and 270 in housing 256 communicate bore 258 with a fuel injection nozzle via a manifold consisting of tubes 272, 274 and 276; in the system of FIG. 1, tube 276 would communicate directly with fuel injection nozzle 32; in the system of FIG. 3 tube 276 would communicate with the injection nozzle via the mechanical fuel distributor 26. Movable valving member 260 is in slideable and rotatable sealing contact with the wall of bore 258. Valving member 260 has formed therein a number of intercommunicated passages for alternately communicating inlet passage 264 with outlet passages 268 and 270. These passages include an annular groove 278, a plurality of radially extending passages 280, a chamber-like passage 282, and a radially extending passage 284. Passages 278, 280 and 282 communicate passage 284 with passage 264 independent of the axial and rotational position of the movable valve member. A combination pinion and cam follower 286 is connected to the upper end of valving member 260 via a one-way clutch (not shown). The pinion portion provides a means for rotating the valving member. The cam follower portion provides a means for axially positioning the valving member in bore 258. The cam follower portion is biased into engagement with a cam 290 by spring 262 acting on the lower end of the valving member. Cam 290 is equivalent to the cams in FIGS. 1 and 3.

Drive assembly 254 includes an annular coil 292 contained in a housing 294 having an opening 296 in one end, a plunger 298 fixed to a rack 300 which extends through the opening, and a helical spring 302 which biases plunger 298 into engagement with the inside rim of opening 296. The rim of opening 296 provides a stop to limit rightward travel of the plunger and the rack when coil 292 is unenergized. A cylindrical sleeve 304 provides a stop for limiting leftward travel of the plunger and rack when coil 292 is energized via a wire 306. A portion of rack 300 is provided with a plurality of gear teeth 308 which engage the teeth of pinion 286. The unshown one-way clutch connecting pinion 286 to movable valving member 260 is arranged to provide a driving connection when rack 300 moves to the left and a slipping connection when the rack moves to the right. Each actuation of the coil rotates the movable valving member 180 degrees.

The static state of valve 250 a moment before the injection system logic suplies a main fuel injection signal is as follows, passage 284 is positioned either vertically up or down, passage 289 is displaced from or aligned with a plane passing through outlet ports 268 and 270, passage 284 is pressurized with high pressure fuel, and plunger 298 is against the rim of opening 296. The plane of alignment of passage 284 and passages 268 and 270 is a function of throttle position and is controlled by cam 290; the degree of plane alignment determines the amount of overlap of the passages as passage 284 traverses either passage 268 or 270 when the movable valve member is rotated. Hence, the rotational speed of the movable valve member can be the same for all engine speeds and loads and the amount of fuel metered can be varied as a function of the passage overlap. Further, drive assembly 254 may be replaced by a variable speed drive driven by the engine or an electric motor.

DETAILED DESCRIPTON OF FIGS. 6 AND 7

FIGS. 6 and 7 schematically illustrate a third embodiment of a fuel metering valve 350 which is adaptable to the fuel injection systems of FIGS. 1 and 3. Valve 350, like valve 250, meters either main fuel or pilot fuel and two of the valves may be combined into a single housing to provide a double fuel metering valve. Valve 350 includes a housing 352 having a central bore 354 and fuel inlet and outlet passages 356 and 358, respectively, a tubular shuttle or movable valving member 360 disposed in the bore, two annular coils 362 and 364, two annular sleeves 366 and 368, and a cam assembly 370. Bore 354 is principally defined by two annular lands 372 and 374 and sleeves 366 and 368, which are all concentric and of such diameter that a slideable sealing contact is established between them and the outer wall of movable valving member 360. The inner wall of movable valving member 360 defines a fuel passage 376 which communicates, at its inlet, with high pressure fuel in a tube 378 via inlet passage 356. In the system of FIGS. 1 and 3 tube 378 would communicate directly with the fuel accumulator. A plurality of radially extending fuel passages 379 in movable valve member 360 communicate passage 376 with an annular fuel passge 380 defined by the juxtaposed ends of sleeves 366 and 368. Annular passage 380 communicates with a tube 382 via outlet passage 358. In the system of FIG. 1 tube 382 would communicate directly with the fuel injection nozzle. In the system of FIG. 3 tube 382 would communicate with the fuel injection nozzle via the mechanical fuel distributor. The axial length or cross-sectional area of annular passage is controlled by cam assembly 370. Cam assembly includes an elliptical plate 384 having an elliptical groove 386 (best seen in FIG. 7), pins 388 and 390 which are securely fixed to sleeves 366 and 368, respectively, and a shaft 392 which is securely fixed to plate 386. Shaft 392 is rotatively supported in an opening 394 in housing 352; a seal 396 prevents fuel leakage around the shaft. Pins 388 and 390 are slideably received in groove 386 and impart a to and fro motion to the sleeves by moving the sleeves together or apart in response to rotation of shaft 392. When installed in the system of FIG. 1 shaft 392 would be equivalent to torque tube 42 and ellipitcal plate 384 and groove 386 would be equivalent to cam 44.

The movable valve member in valving 350 is controlled entirely by coils 362 and 364 which alternately receive main fuel injection signals from the electronic logic via wires 398 and 400, respectively. The electronic logic in a system using valve 350 would be modified to provide two main and pilot fuel injection wires per valve.

The oscilloscope traces in FIGS. 8 and 9 illustrate the respective difference in combustion chamber pressure for a cylinder provided with and without pilot fuel injection and operating at the same horsepower. In FIGS. 8 and 9 the abscissa is scaled in degrees of crankshaft rotation and the ordinate is sealed in pounds per square inch gauge. Curves C and C' shows combustion chamber pressure between approximately 90 degrees before and 90 degrees after top dead center of the compression and the power strokes, respectively. Curves F and F' are superimposed on the graphs to show the point of pilot and main fuel injection relative the crankshaft rotation. The rise P in curve F of FIG. 8 is the opening and closing of the fuel injection nozzle for pilot fuel injection; the rise M is the opening and closing of the fuel injection nozzle for main fuel injection. The rise M in FIG. 9 is the opening and closing of the fuel nozzle for main fuel injection.

The particular pilot fuel injection systems and fuel metering valves for use therein have been disclosed to illustrate the preferred embodiments of the inventions. However, it should be recognized that variations of the systems and valves are within the spirit of the total invention. For example, the amount of fuel metered by valve 350 could be controlled by varying the magnitude of the electrical signals to the coils and maintaining the cross-sectional area of passage 380 fixed, whereby the velocity of the movable valving member would be varied. Valve 350 could also be modified to incorporate some of the features of valve 250. For example, annular passage 380 could be changed to a passage of fixed dimensions such as passage 270 and passages 379 could be reduced to one passage such as passage 284; means could be provided to turn the movable valve member as a function of throttle position to vary the amount of passage overlap as passage 379 traverses passage 380.

I claim:

1. A fluid metering valve adapted to be connected to a source of pressurized fluid, said valve comprising:

a valve housing including a bore, a fluid inlet passage adapted to be connected to said source and having an opening at one end communicating with said bore, and a fluid outlet passage having an opening at one end communicating with said bore;

a valving member in said bore movable from a first static position blocking fluid communication between said inlet passage and said outlet passage to a second static position also blocking said fluid communication;

passage means in said valving member operative during movement of said valving member between said first and second static positions to completely traverse one of said housing passage openings to momentarily define a continuous passage through said valve housing by serially connecting said inlet passage, said passage means and said outlet passage; and first actuation means operative to move said valving member from said first position to said second static position to effect said complete traversing of said passage means across said one housing passage opening to cause said momentary communication and meter a pulse of fluid through said valve and second actuation means operative to move said valving member from said second static position to said first static position at velocities independent of said first actuation means.

2. The metering valve of claim 1, further comprising:

control means operative for varying the amount of fluid metered through said valve housing during said traversing time.

3. The metering valve of claim 2 wherein said control means includes:

means for controlling the effective area of said continuous passage independent of the velocity imparted to said valving member by said actuation means.

4. The metering valve of claim 1, wherein said actuation means includes:

means for moving said valving member axially in said bore, whereby said passage means opening traverses said one housing passage opening.

5. The metering valve of claim 1, wherein said actuation means includes:

means for rotatively moving said valving member in said bore in stepped fashion, whereby said passage means traverses said one housing passage opening.

6. The metering valve of claim 1, wherein:

said one housing passage opening is said outlet passage opening.

7. The metering valve of claim 1, wherein:

said inlet passage opening is in continuous communication with said passage means.

8. The metering valve of claim 4, further comprising:

control means operative for varying the amount of fluid metered through said valve housing during said traversing time.

9. The metering valve of claim 8, wherein said control means includes:

means for varying the effective area of said continuous passage independent of the velocity imparted to said valving member by said actuation means.

10. The metering valve of claim 9, wherein said varying means includes:

means for changing the cross-sectional area of said one housing passage opening.

11. The metering valve of claim 10, wherein said varying means includes:

a cylindrical sleeve having
  (1) an inside diameter in slideable sealing contact with said valving member, and
  (2) an end face defining an edge of said one housing passage opening; and means for varying the position of said sleeve, whereby the cross-sectional area of said one housing passage opening is varied.

12. The metering valve of claim 11, wherein:

said second actuation means includes a spring biasing said valve member toward said first static position; and said first actuation means moves said valving member toward said second static position and counter to the biasing force of said spring.

13. The metering valve of claim 10, wherein:

said bore includes two annular lands separated by a substantially annular recess;

said one housing passage opening is defined by juxtaposed end faces of two cylindrical sleeves disposed in said annular recess and having an inside diameter in slideable sealing contact with said valving member; and said varying means includes means for moving said sleeves to and fro relative to each other, whereby the cross-sectional area of said one housing opening is varied.

14. The metering valve of claim 5, further comprising:

control means for varying the amount of fluid metered through said valve housing during said traversing time.

15. The metering valve of claim 14, wherein said control means includes:

means for varying the effective area of said continuous passage independent of the velocity imparted to said valving member by said actuation means.

16. The metering valve of claim 15, wherein said varying means includes:

means for axially positioning said valving member in said bore such that the amount of opening overlap of said passage means opening and said one housing passage opening varies the effective area of said continuous passage during the traversing time of said openings.

17. A fluid metering valve adapted to be connected to a source of pressurized fluid, said valve comprising:

a valve housing including a bore, a fluid inlet passage adapted to be connected to said source and having an opening at one end communicating with said bore, and a fluid outlet passage having an opening at one end communicating with said bore;

a valving member in said bore moveable from a first static position blocking fluid communication between said inlet passage and said outlet passage to a second static position also blocking said fluid communication;

passage means in said valving member operative during movement of said valving member between said first and second static positions to completely traverse one of said passage openings to momentarily define a continuous passage through said valve housing by serially connecting said inlet passage, said passage means, and said outlet passage; and electromagnetic means operative to move said valving member from said first static position to said second static position to effect said complete traversing of said passage means opening across said one housing passage opening to cause said momentary communication and meter a pulse of fluid through said valve.

18. The metering valve of claim 17, wherein said electromagnetic means includes:

means for moving said valving member axially in said bore from said first static position in which said passage means opening is disposed on one side of said one housing passage opening to a said second static position in which said passage means opening is disposed on an opposite side of said one housing passage opening.

19. The metering valve of claim 18, further comprising:

a cylindrical sleeve having
(1) an inside diameter in slideable sealing contact with said valving member, and
(2) an end face defining an edge of said one housing passage opening; and means for varying the position of said sleeve, whereby the cross-sectional area of said one housing passage is varied.

20. The metering valve of claim 19, further comprising:

a spring for moving said valving member from said second position to said first position following operative termination of said electromagnetic means.

21. The metering valve of claim 18, wherein:

said bore includes two annular lands separated by a substantially annular recess;

said one housing passage opening is defined by juxtaposed end faces of two cylindrical sleeves disposed in said annular recess and having an inside diameter in slideable sealing contact with said valving member; and further comprising means for moving said sleeves to and fro relative to each other, whereby the cross-sectional area of said one housing passage opening is varied.

22. The metering valve of claim 21, wherein said electromagnetic means includes:

first and second solenoids disposed at opposite ends of said bore and said valving means moves from said first position to said second position when said first solenoid is energized and said valving means moves from said second position to said first position when said second solenoid is energized.

23. The metering valve of claim 17, wherein said electromagnetic means includes:

means for rotatively moving said valving member in said bore in a stepped fashion from a first static position in which said passage means opening is disposed on one side of said one housing passage opening to said second static position in which said passage means opening is disposed on an opposite side of said one housing passage opening.

24. The metering valve of claim 23, further comprising:

means for axially positioning said valving in said bore such that the amount of opening overlap of said passage means opening and said one housing passage opening varies the effective area of said continuous passage during the traversing time of said openings.

25. A fluid metering valve adapted to be connected to a source of pressurized fluid, said valve comprising:

a valve housing including a bore, a fluid inlet passage adapted to be connected to said source and having an opening at one end communicating with said bore, and a fluid outlet passage having an opening at one end communicating with said bore;

a valving member in said bore moveable from a first static position blocking fluid communication between said inlet passage and said outlet passage to a second static position also blocking said fluid communication;

passage means in said valving member having a first opening in constant communication with said inlet passage opening and a second opening in constant communication with said first opening, said second opening being spaced from said outlet passage opening and sealed from communication with said outlet passage opening by the wall of said bore when said valving member is in said first and second static positions;

electromagnetic means operative to move said valving member from said first static position to said second static position to completely traverse said second opening across said outlet passage opening and meter a pulse of fluid through said valve by momentarily defining a continuous passage through said valve housing by serially connecting said inlet passage, said passage means, and said outlet passage during the traversing of said outlet opening by said second opening; and means for controlling the effective area of said continuous passage independent of the velocity of said valving member in moving from one of said positions to the other, whereby the amount of fluid delivered through said continuous passage is varied.

26. The metering valve of claim 25, further comprising:

a spring biasing said valving member to said first position; and said electromagnetic means is a solenoid selectively operative to provide a magnetic force for moving said valving member axially from said first position to said second position.

27. The metering valve of claim 25, wherein said electromagnetic means includes:

first and second solenoids selectively operative to provide a magnetic force for alternately moving said valving member axially from one position to the other.

28. The metering valve of claim 25, wherein said electromagnetic means includes:

means for rotating said valving member in said bore in a stepped fashion, whereby said second opening moves along an arcuate path while traversing said outlet opening.

29. A fluid metering valve adapted to be connected to a source of pressurized fluid and operative to sequentially meter a pilot pulse of fluid and then a main pulse of fluid, said valve comprising:

a valve housing including bore means, fluid inlet passage means adapted to be connected to said source and having opening means communicating with said bore means, and fluid outlet passage means having opening means communicating with said bore means;

valving means in said bore means moveable between first and second static positions blocking fluid communication between said inlet and outlet passage means;

pilot and main passages in said valving means operative during movement of said valving means between said first and second positions to completely traverse said outlet passage opening means; and actuation means operative to move said valving means in one direction between said first and second static positions to effect a sequential traversing of said outlet passage opening means by said pilot and main passages for sequentially metering said pilot pulse and then said main pulse.

30. The fluid metering valve of claim 29 wherein said actuation means always moves said valving means at the same velocity in said one direction.

31. The fluid metering valve of claim 29 wherein said actuation means includes solenoid means for moving said valving means.

32. A fluid metering valve adapted to be connected to a source of pressurized fluid and operative to sequentially meter a pilot pulse of fluid and the main pulse of fluid, said valve comprising:

a valve housing including bore means, fluid inlet passage means adapted to be connected to said source and having opening means communicating with said bore means, and fluid outlet passage means having opening means communicating with said bore means;

valving means axially moveable in said bore between first and second static positions blocking fluid communication between said inlet and outlet passage means;

pilot and main passages in said valving means operative during movement of said valving means between said first and second positions to completely traverse said outlet passage opening means; and actuation means operative to move said valving means axially in one direction in said bore between said first and second positions at a velocity that is always the same to effect a sequential traversing of said outlet passage opening means by said pilot and main passages for sequentially metering said pilot pulse and the said main pulse.

* * * * *